United States Patent [19]

Kasahara et al.

[11] 4,417,126

[45] Nov. 22, 1983

[54] METHOD OF CONTROLLING A WEAVING PATH OF A WELDING TORCH IN ARC WELDING WITH A CONSUMABLE ELECTRODE

[75] Inventors: Kenji Kasahara, Fujisawa; Yoshiaki Munezane, Kamakura, both of Japan

[73] Assignee: Kabushiki Kaisha Kobe Seiko Sho, Kobe, Japan

[21] Appl. No.: 374,735

[22] Filed: May 4, 1982

[30] Foreign Application Priority Data

Sep. 24, 1981 [JP] Japan ................................ 56-151553

[51] Int. Cl.³ .............................................. B23K 9/12
[52] U.S. Cl. ........................... 219/124.22; 219/124.34; 219/125.12
[58] Field of Search ...................... 219/124.34, 124.22, 219/125.12

[56] References Cited

U.S. PATENT DOCUMENTS

| | | | |
|---|---|---|---|
| 4,151,395 | 4/1979 | Kushner et al. ................. | 219/124.34 |
| 4,302,655 | 11/1981 | Edling ............................. | 219/125.12 |
| 4,316,075 | 2/1982 | Isoya et al. ..................... | 219/124.22 |

FOREIGN PATENT DOCUMENTS

52-78654  2/1977  Japan .

Primary Examiner—C. C. Shaw
Attorney, Agent, or Firm—Oblon, Fisher, Spivak, McClelland & Maier

[57] ABSTRACT

A method for controlling a weaving path of a welding torch to trace a welding line in consumable electrode arc welding, including: detecting in a rightward weaving stroke of weaving motion a welding current level $IL_1$ at the left end position of the weaving motion and a minimum current level $IL_2$ during the period of the rightward weaving stroke and in a leftward weaving stroke of weaving a welding current level $IR_1$ at the right end position of the weaving motion and a minimum current level $IR_2$ during the period of the leftward weaving stroke; calculating the values of differential current $(IL_1-IL_2)$ and $(IR_1-IR_2)$ in the rightward and leftward weaving strokes, respectively; comparing and computing a disparity, if any, between the differential current values; and shifting the position of a median point of weaving motion according to the extent of the disparity in the differential current values.

3 Claims, 7 Drawing Figures

METHOD OF CONTROLLING A WEAVING PATH OF A WELDING TORCH IN ARC WELDING WITH A CONSUMABLE ELECTRODE

BACKGROUND OF THE INVENTION

1. Field of the Invention

This invention relates to consumable electrode arc welding for joining a gap having a V- or L-shape or a similar shape by weaving a torch along a welding line, and more particularly to a method for automatically controlling the center position of weaving to trace a weld line.

2. Description of the Prior Art

Automation of arc welding has been a subject of energetic studies in order to improve the productivity of welded structural materials, reduce the welding cost and make uniform the quality of welding operations. The greatest problem which is involved in the automation of arc welding is the control of the weaving path along the welding line.

In short, the welding line tracing operation depends on how well a welding line detector can overcome the structural limitations of welding materials and variations in the shape of the welding gaps and whether or not it can accurately detect a welding line to be followed in spite of deviations due to distortions during a welding operation. Therefore, there have thus far been proposed various kinds of detection systems, including mechanical, electrical and fluid type detection systems.

The conventional detection systems have a common difficulty in that it is difficult to attach a detector in a position close to a welding torch due to bad environmental conditions including the heat peculiar to arc welding, blazing light, fumes, spatters and narrow space. Therefore, in some cases the detector can be an obstacle and restricts application to certain structural materials, which is another problem in addition to the difficulty of detecting the welding line at an actual arc generating point.

In an attempt to overcome these problems or difficulties, many efforts have been made in the past several years to derive a method for detecting the weld line at an arc generating point. For example, studies are actually being made on a method of analyzing a picture image of the arc generating point taken by an ITV camera for the detection of the welding line, which however still has a number of technical and costwise problems to be solved before application, such as the limitations of the mounting position due to the use of a bulky ITV camera, costly equipments, etc.

On the other hand, there has been proposed a more acceptable method which, for real time detection of the welding line at an arc generating point, utilizes certain phenomena which take place during the welding operation. This method detects the welding line based on a of correlation between the length of welding wire extension and the amount of welding current without necessitating a detector exclusively for this purpose.

The present invention concerns an automatic weaving path control method of the category which utilizes such phenomena in welding operation.

A method of automatic weaving path control based on this sort of phenomena is proposed, for instance, in Laid-Open Japanese Patent Application No. 52-78654 in which the values of welding current at the reversing ends of a weaving motion are detected and compared with each other, and the position of a holder of a weaving source or the axis of the weaving motion is adjusted such that the currents at the reversing ends are equalized.

In the method mentioned above, the detected values of welding current at the opposite reversing ends of the weaving motion are compared with each other and a value of differential current which is obtained by subtracting a value of current at a left end position from a value at an opposite right end position is relied on as a value which represents a deviation (a deviate distance) of the center or median point of weaving from the weld line, so that the welding line tracing accuracy depends on the degree of accuracy with which the value of differential current/deviation is detected. Therefore, it becomes necessary to ensure detection of very small values of differential current, that is to say, to ensure extremely high detection sensitivity to the welding current.

Besides, in order to cope with alterations of welding conditions, it is required to secure high detection sensitivity over a wide range of welding current settings. For instance, the value of differential current/deviation is very small in the fillet welding of a short leg length where the welding is performed at a low current and with a small weaving width.

According to the results of experiments, for example, of a horizontal fillet welding of a leg length of 6 mm, using a shielding gas composition of Ar+20% $CO_2$, a wire of a diameter of 1.2 mm, an average welding current of 280 A, a voltage of 28 V, a welding speed of 55 cm/min, a weaving motion of 150 cycles/minute, and a weaving width of 3 mm, the differential current as measured by an optical electromagnetic oscillograph is as small as about 5 amperes when the centerline of weaving is deviated by 1 mm toward a vertical plate. In this instance, if the target of tracing accuracy is set at 0.2 mm, there will be required a current detection sensitivity of 1/280, which is only possible by a complicated and costly control device.

SUMMARY OF THE INVENTION

It is therefore an object of the present invention to overcome the above-mentioned problems and difficulties of the conventional methods. A more particular object of the present invention is to provide a method for automatically controlling a weaving path to trace a welding line in consumable electrode arc welding.

These and other objects are achieved according to the present invention by providing a novel method for controlling a weaving path of a welding torch to trace a welding line in consumable electrode arc welding, including detecting in a rightward weaving stroke of weaving motion a welding current level $IL_1$ at the left end position of the weaving motion and a minimum current level $IL_2$ during the period of the rightward weaving stroke and in a leftward weaving stroke of weaving a welding current level $IR_1$ at the right end position of the weaving motion and a minimum current level $IR_2$ during the period of the leftward weaving stroke; calculating the values of differential current ($IL_1$-$IL_2$) and ($IR_1$-$IR_2$) in the rightward and leftward weaving strokes, respectively; comparing and computing a disparity, if any, between the differential current values; and shifting the position of a median point of weaving motion according to the extent of the disparity in the differential current values.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
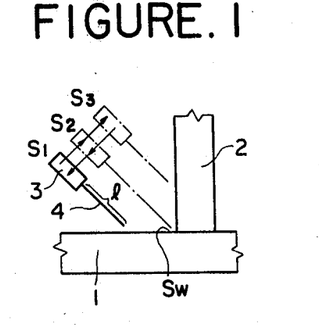
FIG. 1 is a diagrammatic illustration of a welding operation where the median point of weaving motion correctly traces a welding line.

Referring to the accompanying drawings, wherein like reference numerals designate identical or corresponding parts throughout the several views, and first to FIG. 1, there is shown by way of example a fillet welding operation using a welding power source of constant voltage characteristics, in which a horizontal plate 1 and a vertical plate 2 are welded together by weaving a welding torch 3 along and across a welding line Sw (extending in a direction perpendicular to the surface of the figure). In this instance, if a welding wire 4 is fed at a constant speed, the length $l$ of wire extension varies depending upon the shape of beveling.

Figure 2:
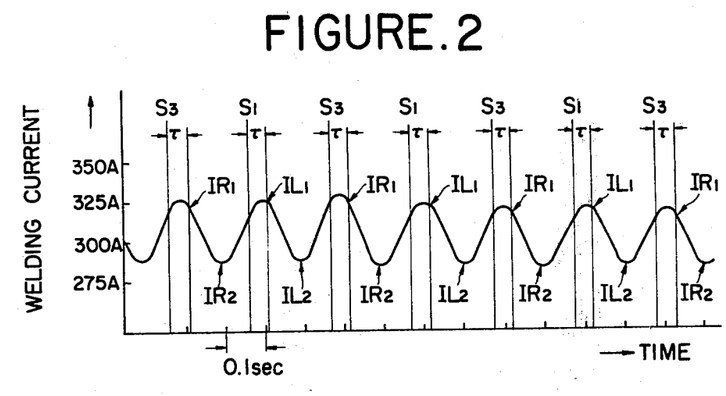
FIG. 2 is a chart of an output waveform of an optical electromagnetic oscillograph measuring the welding current in an operation as in FIG. 1.

FIG. 1 illustrates a good example in which a median point $S_2$ of the weaving motion of the welding torch 3 correctly traces the welding line Sw. FIG. 2 shows variations in the welding current in such a welding operation, more specifically, the waveform of current in the periods of forward weaving motion of the torch 3 from a left end position $S_1$ to a right end position $S_3$ through a median point $S_2$ and in the periods of reverse weaving motion from a right end position $S_3$ to a left end position $S_1$, as measured and recorded by an optical electromagnetic oscillograph in a fillet welding with a leg length of 7.5 mm, using a shielding gas composition of Ar+20% $CO_2$, a wire electrode of a diameter of 1.2 mm, an average welding current of 305 A, a welding voltage of 29 V, a welding speed of 35 cm/min, a weaving motion of about 150 cycles/min, and a weaving width of 6 mm. A low-pass filter with a cut-off frequency $fc$ at 10 Hz is used in the measurement of the welding current for removing high frequency components attributable to the line frequency of the welding power source or the components resulting from irregular shortcircuiting of the arc. The time $\tau$ of the phase lag of the welding current signal through the low-pass filter is about 0.05 second. The right and left end positions of the weaving motion are detected by proximity switches which are mounted on the weaving mechanism.

As clear from FIG. 2, when the welding line Sw is correctly traced by the median point $S_2$ of the weaving width of the welding torch 3, the current levels $IL_1$ and $IR_1$ at the left and right reversing ends of weaving motion are equal to each other by the correlation between the length of wire extension and welding current, and likewise the minimum current levels $IL_2$ and $IR_2$ in the forward and reverse strokes are at the same level.

It will also be understood that the current levels $IL_1$ and $IR_1$ at the left and right end positions should be detected with a delay of time $\tau$, respectively, from the time points when the left and right end positions are actually reached, in view of the phase lag of the welding current signal through the low-pass filter. On the other hand, the values of minimum welding current levels $IL_2$ and $IR_2$ are obtained by detecting the minimum current value in the forward or reverse stroke of the weaving motion after detecting the value of left end current level $IL_1$ or right end current $IR_1$.

Figure 3:
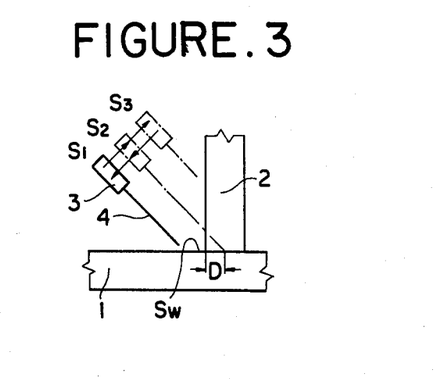
FIG. 3 is a diagrammatic illustration of a welding operation where the median point of weaving motion is deviated from a welding line.
Figure 4:
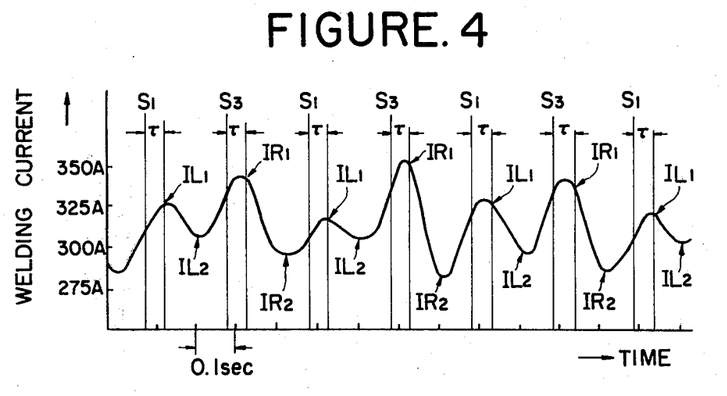
FIG. 4 is a chart of an output waveform of an optical electromagnetic oscillograph measuring the welding current in an operation as in FIG. 3.

FIG. 3 shows an weaving operation in which the median point $S_2$ of the weaving width is deviated from the welding line Sw and toward the vertical plate 2, which is reflected by variations in the welding current in the forward and reverse strokes of the weaving motion as shown in FIG. 4.

FIG. 4 depicts a waveform of welding current measured and recorded by an optical electromagnetic oscillograph in a horizontal fillet welding operation under the same condition as in FIG. 2 except for a deviation of $D=2$ mm from the welding line Sw. It will be understood therefrom that a deviation toward the vertical plate 2 causes a difference between the values of the right and left end currents $IR_1$ and $IL_1$ and makes $IR_1 > IL_1$.

What is important in FIG. 4 is the fact that the minumum welding current levels $IL_2$ and $IR_2$ in the forward and reverse strokes of weaving motion become unequal and $IR_2 < IL_2$, although it appears that the values of the two minimum currents should be $IR = IL$ according to a simple assumption from the correlation between the length of wire extension and the amount of welding current. The reason for this phenomenon is not necessarily clear but, from the data of arc observation during experiments, it is gathered that the arc behaves differently to the molten pool on the welding line at the beveling when the median point $S_2$ of weaving motion is deviated from the welding line Sw, due to a variation in the behavior of the molten pool, resulting in the variations of the welding current as shown in FIG. 4.

Further, it has been confirmed by experiments that the minimum current level $IR_2$ in the reverse stroke of weaving motion is always smaller than the minimum current level $IL_2$ in the forward stroke and that the difference between the two minimum currents, $(IL_2 - IR_2)$, is proportional to the value of deviation of the median point $S_2$ from the welding line Sw.

On the contrary, if the median point $S_2$ of weaving motion is deviated toward the horizontal plate 1, the above-mentioned relations of FIG. 4 are inserted, namely, the end current signals become $IL_1 > IR_1$ and the minimum current signals in the forward and reverse strokes become $IR_2 > IL_2$.

To summarize, the above-mentioned various current signals provide the following criteria of deviate directions, in which the left end and minimum current levels in the weaving stroke from the left end position $S_1$ to the right end position $S_3$ past the median point $S_2$ are expressed by $IL_1$ and $IL_2$, respectively, while the right end and minimum current levels in the weaving stoke from the right end position $S_1$ to the left end position $S_3$ past the median point $S_2$ are expressed by $IR_1$ and $IR_2$, respectively.

$(IL_1\text{-}IL_2)=(IR_1\text{-}IR_2)$: The median point $S_2$ of weaving motion in alignment with the welding line Sw.

$(IL_1\text{-}IL_2)>(IR_1\text{-}IR_2)$: The median point $S_2$ of weaving motion deviated to the left of the welding line Sw.

$(IL_1\text{-}IL_2)<(IR_1\text{-}IR_2)$: The median point $S_2$ of weaving motion deviated to the right of the welding line Sw.

In addition, the values of differential currents $(IL_1\text{-}IL_2)$ and $(IR_1\text{-}IR_2)$ as well as the disparity between the two differential currents, $[(IL_1\text{-}IL_2)\text{-}(IR_1\text{-}IR_2)]$, are all proportional to the amount of deviation of the median point $S_2$ of weaving motion from the welding line Sw.

Thus, it becomes possible to control the path of weaving automatically in such a manner that the welding line is traced by the median point of weaving, by detecting the end current levels $IL_1$ and $IR_1$ and minimum current levels $IL_2$ and $IR_2$ which appear at every half period of weaving motion and calculating and comparing the values of differential currents $(IL_1\text{-}IL_2)$ and $(IR_1\text{-}IR_2)$, controlling the position of the median point of weaving according to the result of the comparison, namely, shifting the position of the median point in a direction and in a certain degree which offsets a disparity if any, between the two differential currents, if according to the criteria of deviate direction mentioned previously. As compared with the conventional method which relies on the differential current between the welding current levels at the right and left ends of the weaving motion, the method of the present invention can ensure a higher detection sensitivity by the use of a detector with the same level of current response since the variance between the two differential current signals indicates a deviation of weaving on a magnified scale to permit a weaving path control of higher accuracy.

For instance, in detecting a deviation of weaving as shown in FIG. 4, the conventional method of detecting the current levels at the right and left ends of weaving relies on a current differential of about 11 A/mm, in contrast to the method of the present invention in which the same deviation is detected by an almost doubled signal of about 20 A/mm, a disparity between the two differential currents $[(IL_1\text{-}IL_2)\text{-}(IR_1\text{-}IR_2)]$, that is to say, with a doubled detection sensitivity to deviations.

Figure 5:
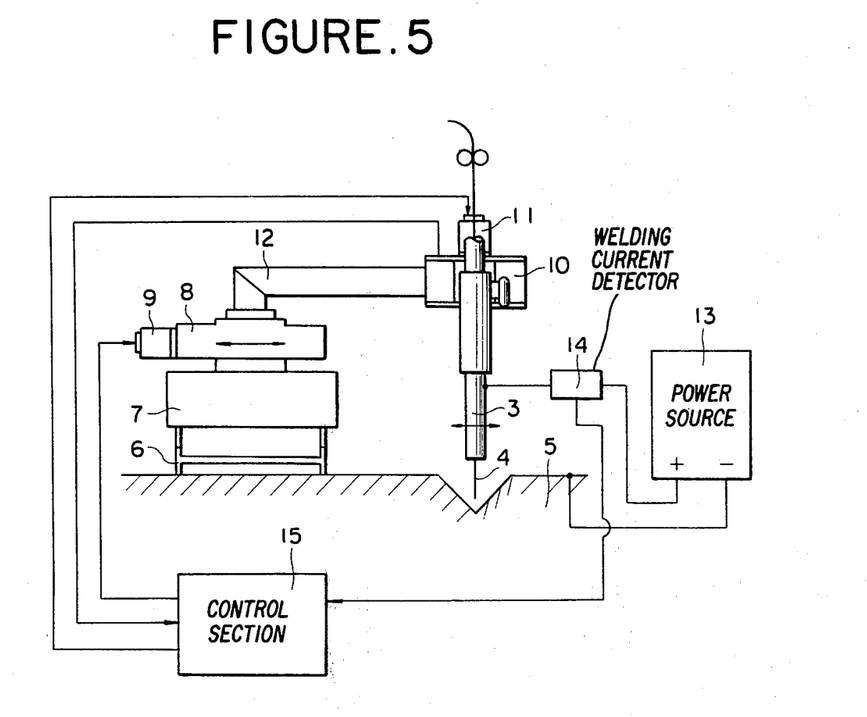
FIG. 5 is a schematic diagram showing an outline of a welding machine to which the present invention is applied.
Figure 6:
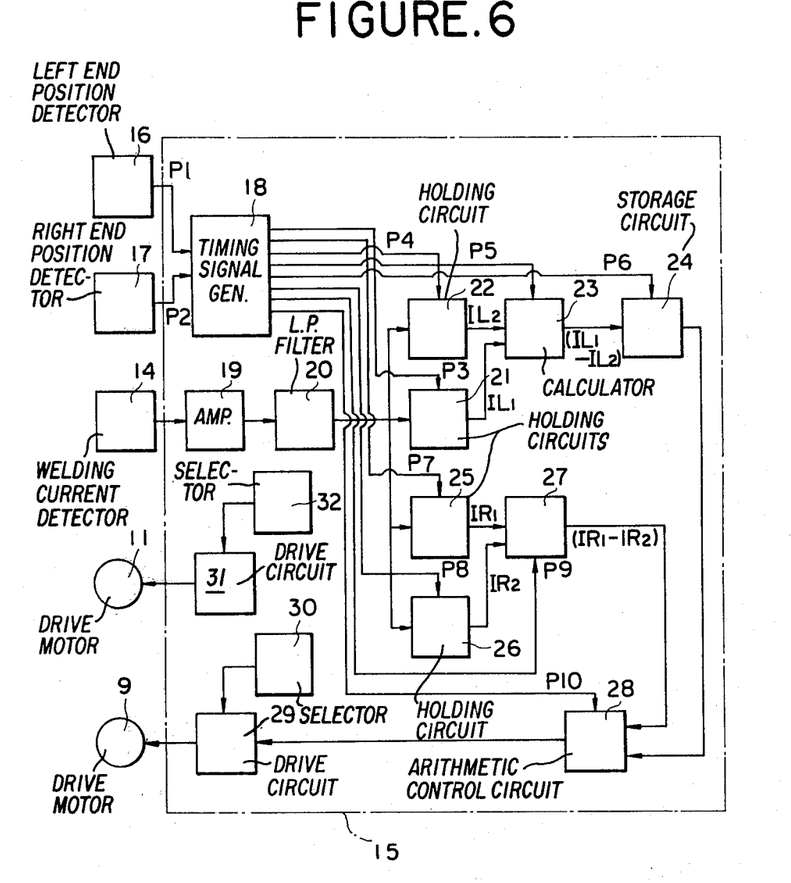
FIG. 6 is a block diagram of a control section of the welding machine of FIG. 5.
Figure 7:
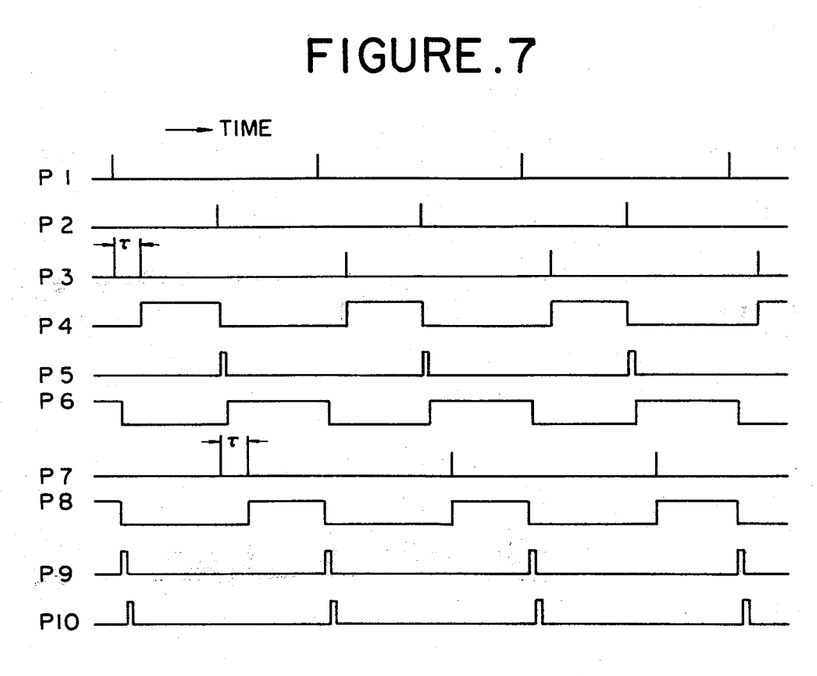
FIG. 7 is a timing chart explanatory of the operation of the control section shown in FIG. 6.

Reference is now had to FIG. 5 which shows a welding machine with a weaving path control system for carrying out the method of the present invention, and to FIGS. 6 and 7 which are a block diagram and an operating timing chart of a control section of the system, respectively.

In FIG. 5, designated at 3 is a welding torch, at 4 a wire electrode, at 5 a base material with a V-beveling, at 6 rails providing a track for a carriage 7, at 8 a slider for adjusting the median point of weaving motion in lateral directions, and at 9 a motor for driving the slider 8. Further, indicated at 10 is a weaving mechanism for imparting weaving motion to the welding torch 3, at 11 a motor for driving the weaving mechanism 10, at 12 a flange for connecting the slider 8 with the weaving mechanism 10, at a 13 a power source for supplying welding current or voltage across the welding torch 3 and base material 5, and at 14 a detector for detecting the welding current.

A control section which is indicated by reference numeral 15 is supplied with the output signal of the welding current detector 14 and with weaving end signals produced by weaving end detectors (omitted in FIG. 5) mounted on the weaving assembly 10 to detect the right and left end positions of the weaving motion. In turn, the control section 15 produces an output signal for controlling the drive motor 11 of the weaving mechanism 10 and an output signal for controlling the drive motor 9 of the slider 8 to shift the median point of weaving motion according to the method of the present invention.

In FIG. 6, designated at 9 is the drive motor for the slider 8, at 11 the drive motor for the weaving mechanism, at 14 the welding current detector, at 16 a left end position detector in the form of a proximity switch or the like, at 17 a right end position detector and at 15 the control section.

The control section 15 includes a timing signal generator 18 which produces timing signals for controlling operations of various circuits according to position signals $P_1$ and $P_2$ indicating left and right end positions of the weaving motion, respectively.

Further included in the control section 15 are an amplifier 19 for amplifying the detected welding current signal, a low-pass filter 20 for removing high frequency components attributable to lines frequency, a left end current detecting/holding circuit 21 for detecting and holding a left end current level $IL_1$ in response to the left end position signal $P_3$, a first minimum current detecting/holding circuit for detecting and holding a minimum welding current $IL_2$ in the forward stroke of weaving in response to a first minimum current detection signal $P_4$ indicating the forward weaving period, a first differential current calculator 23 for calculating the difference between the left end current level $IL_1$ and the minimum current level $IL_2$ upon termination of the forward stroke of weaving motion in response to a first differential current calculation signal $P_5$ to obtain the value of the differential current $(IL_1\text{-}IL_2)$, and a first differential current storage circuit 24 for storing the calculated value of the differential current $(IL_1\text{-}IL_2)$ for a period specified by a first differential current storage signal $P_6$.

Similarly, the control section 15 includes a right end current detecting/holding circuit 25 for detecting and holding the value of right end current $IR_1$ in response to a right end position signal $P_7$, a second minimum current detecting/holding circuit 26 for detecting and holding the value of the minimum current in the reverse stroke of weaving specified by a second minimum current detection signal $P_8$, and a second differential current calculating circuit 27 which calculates the difference between the right end current level $IR_1$ and the minimum current level $IR_2$ upon termination of the reverse stroke of weaving motion to produce a signal indicating the value of the differential current $(IR_1\text{-}IR_2)$.

Indicated at 28 is an arithmetic control circuit which compares the two differential current signals $(IL_1\text{-}IL_2)$ and $(IR_1\text{-}IR_2)$ in response to a comparison trigger signal $P_{10}$ to calculate the disparity of the differential signals, if any, at 29 a drive circuit for the slider drive motor, at 30 a selector for manually moving the slider 8, at 31 a drive circuit for the weaving mechanism drive motor, and at 32 a weaving speed selector. The width of weaving is preset at a suitable value by adjusting the mechanical parts of the weaving mechanism.

Now, operation of the control section 15 is explained with reference to FIGS. 6 and 7.

As soon as the welding torch 3 reaches the left end position of weaving, a left end signal $P_1$ produced by the left end position detector 16 is supplied to the timing signal generator 18. Upon receipt of the left end signal $P_1$, the timing signal generator 18 produces a left end current detection signal $P_3$ with a delay of $\tau$ which corresponds to the phase lag through the low-pass filter of the welding current signal to the left end current detecting/holding circuit 21.

Upon receipt of the left end current detection signal $P_3$, the left end current detecting/holding circuit 21 reads the welding current signal from the welding current detector 14 through amplifier 19 and low-pass filter 20 to detect and hold the value of the left end current level $IL_1$. Simultaneously with the detection of the left end current $IL_1$, the first minimum current detection signal $P_4$ is supplied to the first minimum current detecting/holding circuit 22 to read and hold the minimum level $IL_2$ of the welding current signal in the period of the forward stroke of weaving until the welding torch 3 reaches the right end position.

As soon as the welding torch 3 reaches the right end position by the progress of weaving, a right end position signal $P_2$ produced by the right end position detector 17 is supplied to the timing signal generator 18. Upon receipt of the right end position signal $P_2$, the timing signal generator 18 sends out a first differential current calculation signal $P_5$ to the first differential current calculator 23. The first differential current calculator 23 then calculates the difference between the left end current level $IL_1$ detected and held in the first left end current detecting/holding circuit 21 and the minimum current level $IL_2$ detected and held in the first minimum current detecting/holding circuit 22 to produce a signal indicating the value of differential current ($IL_1$-$IL_2$).

When the calculation of the differential current ($IL_1$-$IL_2$) is completed, a first differential current storage signal $P_6$ is sent to the first memory circuit 24 to store therein the calculated value of differential current ($IL_1$-$IL_2$). The current values detected by and held in the left end current detecting/holding circuit 21 and the first minimum current detecting/holding circuit 22 are cancelled at the time point when the differential current ($IL_1$-$IL_2$) is stored in the circuit 24.

As the welding torch 3 reaches the right end position, the timing signal generator 18 sends out a right end current detection signal $P_7$ to the right end current detecting/holding circuit 25 in response to the right end position signal but with a delay of $\tau$ which corresponds to the phase lag through the low-pass filter of the welding current. When the right end current detection signal $P_7$ is received, the right end current detecting/holding circuit 25 reads in the welding current signal to detect and hold the value of the right end current $IR_1$. Simultaneously with the detection of the right end current level $IR_2$, the second minimum current detection signal $P_8$ is sent to the second minimum current detecting/holding circuit 26 to start reading the welding current signal to measure and hold the value of a minimum current level $IR_2$ in the period of the reverse stroke of weaving until the welding torch 3 reaches the left end position.

As soon as the welding torch 3 reaches the left end position again by further progress of the weaving operation, the timing signal generator 18 sends out a second differential current calculation signal $P_9$ to the second differential current calculator 27. Then, the second differential current calculator 27 calculates the difference between the values of the right end current $IR_1$ detected and held in the right end current detecting/holding circuit 25 and the reverse stroke minimum current $IR_2$ detected and held in the second minimum current detecting/holding circuit 26.

At the time point when the calculation of differential current ($IR_1$-$IR_2$) is completed, the timing signal generator 18 sends out a comparison trigger signal $P_{10}$ to the arithmetic circuit 28 thereby to read the values of the differential current ($IL_1$-$IL_2$) stored in the first differential current memory circuit 24 and the differential current ($IR_1$-$IR_2$) calculated by the second differential current calculating circuit 27 and compute the disparity between the two differential currents, [($IL_1$-$IL_2$)-($IR_1$-$IR_2$)], if any.

If a disparity is detected as a result of comparison of the values of the two differential currents, the arithmetic control circuit 28 produces a deviation signal indicating the degree and direction of deviation according to the value of the detected disparity and the criteria of deviate directions as mentioned hereinbefore, for supply to the drive circuit 29. Upon reading the amount and direction of deviation, the drive circuit 29 drives the motor 9 to shift the slider 8 according to the amount and direction of deviation, thereby bringing the median point of weaving into alignment with the welding line. At the time point when the comparison and calculation of the numeric control circuit 28 is completed, the current values detected and held in the right end current detecting/holding circuit 25 and the second minimum current detecting/holding circuit 26 as well as the value of differential current ($IL_1$-$IL_2$) stored in the first differential current memory circuit 24 are erased.

The cycle of the foregoing operation is repeated in order to control the weaving path automatically along a welding line.

As clear from the foregoing description, the present invention controls the weaving path in arc welding by detecting in the forward and reverse strokes of weaving motion the welding current levels at the left and right end positions and minimum current levels to calculate the differential current values ($IL_1$-$IL_2$) and ($IR_1$-$IR_2$) in the forward and reverse strokes of weaving, comparing and computing the variance between the two differential current values, and shifting the position of the median point of weaving motion in such a manner as to equalize the two differential current values. Therefore, it becomes possible to enhance the detection sensitivity to deviations from the welding line and to control the weaving path with higher accuracy as compared with the conventional method. In addition, the method of the present invention does not require provision of a detector exclusively for the detection of a welding line so that it can be applied widely to the welding of various structural materials.

Obviously, numerous modifications and variations of the present invention are possible in light of the above teachings. It is therefore to be understood that within the scope of the appended claims, the invention may be practiced otherwise than as specifically described herein.

What is claimed as new and desired to secured by Letters Patent of the United States is:

1. A method for controlling a weaving path of a welding torch to trace a welding line in consumable electrode arc welding, the comprising:

detecting in a rightward weaving stroke of weaving motion a welding current level $IL_1$ at the left end position of the weaving and a minimum current level $IL_2$ during the period of the rightward weaving stroke and in a leftward weaving stroke of weaving a welding current level $IR_1$ at the right end position of the weaving motion and a minimum current level $IR_2$ during the period of the leftward weaving stroke;

calculating the values of differential current $(IL_1-IL_2)$ and $(IR_1-IR_2)$ in the rightward and leftward weaving strokes, respectively;

comparing and computing a disparity, if any, between said differential current values; and shifting the position of a median point of weaving motion according to the extent of said disparity in said differential current values.

2. A method as set forth in claim 1, wherein said end and minimal levels of said welding current are detected through a low-pass filter.

3. A method as set forth in claim 2, wherein said welding current levels at said left and right end positions are read with a time delay corresponding to a phase lag of the welding current signal through said low-pass filter.

* * * * *

UNITED STATES PATENT AND TRADEMARK OFFICE
CERTIFICATE OF CORRECTION

PATENT NO.  : 4,417,126
DATED       : November 22, 1983
INVENTOR(S) : KASAHARA ET AL It is certified that error appears in the above-identified patent and that said Letters Patent is hereby corrected as shown below:

Column 1, line 56, delete "of".

Column 4, line 35 and 36, delete "minumum" and insert --minimum--.

Column 5, line 1, delete "stoke" and insert --stroke--.

Column 6, line 27, delete "lines" and insert --line--.

Column 8, line 68, delete "the".

Signed and Sealed this

Twenty-second Day of May 1984

[SEAL]

Attest:

*Attesting Officer*

GERALD J. MOSSINGHOFF

*Commissioner of Patents and Trademarks*